United States Patent [19]

Dubowik

[11] 4,388,938

[45] Jun. 21, 1983

[54] FILTER CLEANING APPARATUS

[75] Inventor: John M. Dubowik, Nashua, N.H.

[73] Assignee: Ingersoll-Rand Company, Woodcliff Lake, N.J.

[21] Appl. No.: 262,462

[22] Filed: May 11, 1981

[51] Int. Cl.³ .............................................. B08B 3/02
[52] U.S. Cl. .................................. 134/104; 134/152; 68/200
[58] Field of Search .................. 134/104, 152; 68/200

[56] References Cited

U.S. PATENT DOCUMENTS

| 3,063,874 | 11/1962 | Black, Jr. ..................... | 134/104 X |
| 3,442,273 | 5/1969 | Hanish et al. .................. | 134/152 X |
| 3,592,585 | 7/1971 | Candor et al. .................. | 68/200 X |
| 3,765,051 | 10/1973 | Wanat ........................... | 134/152 X |

Primary Examiner—Robert L. Bleutge
Attorney, Agent, or Firm—F. S. Troidl

[57] ABSTRACT

A stationary member extends across a filter on a movable support. The stationary member has a flexible membrane in contact with the filter. Liquid under pressure is flowed through openings in the flexible membrane and through the filter to remove material from the filter.

3 Claims, 4 Drawing Figures

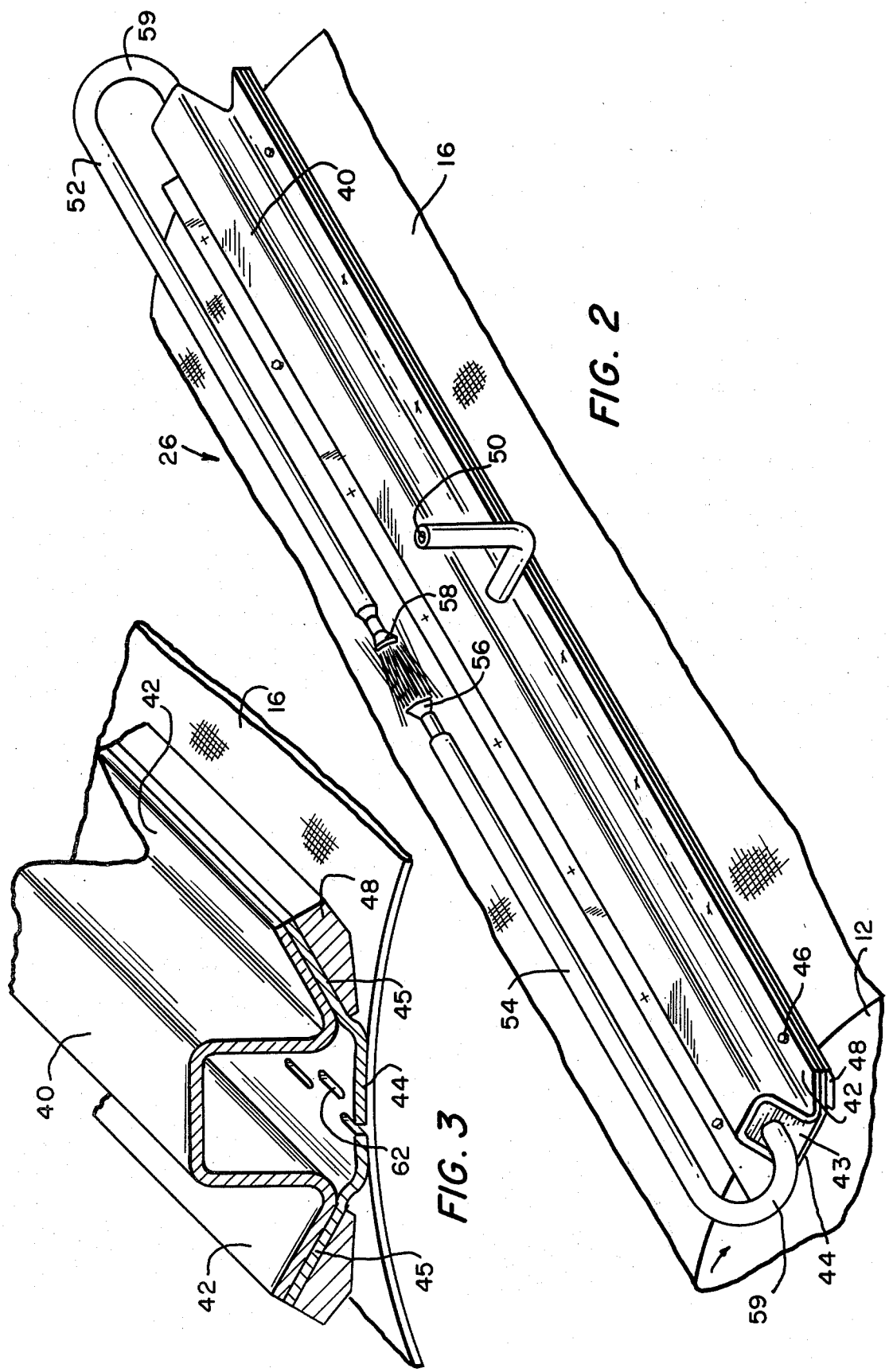

FILTER CLEANING APPARATUS

This invention relates to apparatus for cleaning a filter surface. More particularly, this invention is a cleaning apparatus for continuously cleaning a filter surface such as filters used in removing liquid from a pulp suspension to form a pulp mat.

Often, filters are mounted on supports which have a structure which limits access for cleaning of the filter to the side on which the material to be filtered is deposited. For example, apparatus for thickening and washing suspensions containing fibrous material include one or more rotatable drums. A fibrous mat is formed on the drum by dewatering the suspension by applying a vacuum or lower pressure in the inside of the drum or by applying a positive or higher pressure to the outside of the drum to remove the liquid. Since the drum usually contains a great deal of structure, apparatus for cleaning any deposited or plugging material from the filter after the mat is removed is located on the outside of the drum. Usually various types of low to high pressure liquid showering systems are used to clean the filter surface.

Showering systems can tolerate only a very low solids contamination in the liquid. This means a relatively pure liquid must be used and the filtrate from the drum cannot be reused effectively as the showering liquid. Also, with currently-used nozzle cleaning and pumping systems, it is impossible to effect a backwashing or backflow through the filter after the liquid from the showers has passed through the filter.

Among other things, the new filter cleaning apparatus of this invention permits the user to operate the cleaning apparatus using the filtrate if he so desires. Also, the filter cleaning apparatus, when used with filter supports of particular structure, may be further cleaned by a backwash.

Briefly described, the apparatus for cleaning the filter comprises a movable support on which the filter is supported. A stationary member extends across the filter. The stationary member has a flexible membrane in contact with the filter with the flexible membrane having openings extending therethrough. Means are provided for flowing liquid under pressure through the openings and through the filter and movable support to remove any deposited or plugging material.

The invention, as well as its many advantages, may be further understood by reference to the following detailed description and drawings in which:

FIG. 2 is a perspective view showing the new filter cleaning apparatus in detail;

FIG. 3 is an enlarged, sectional view of the filter cleaning apparatus of FIG. 2.

In the various figures, like parts are referred to by like numbers.

Figure 1:
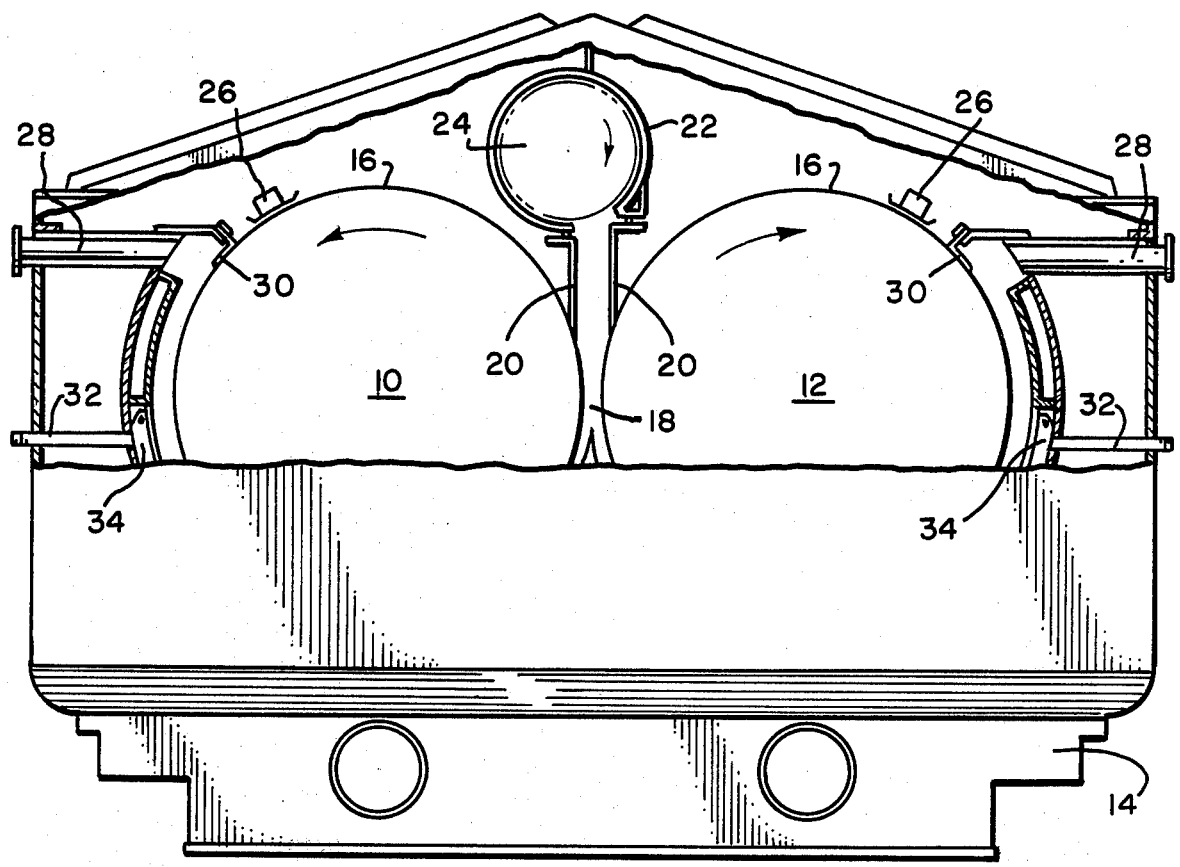
FIG. 1 is a elevational view, partly in section, showing schematically the location of the new filter cleaning apparatus on a system for forming pulp mats from a pulp slurry.

Referring to the figures and, more particularly, to FIG. 1, a washing press is illustrated including a pair of drums or press rolls 10 and 12 which are mounted for rotation about parallel axes and enclosed within a pressurized vat or tank 14. The drums 10 and 12 include circumferential, porous walls or filters 16 converging so as to form a nip 18 and contain the usual axial liquid or filtrate discharge channels (not shown) communicating the openings in the filters 16 with filtrate discharge pipes at the opposite ends of the drums 10 and 12. Individual doctor blades 20 remove pressed, solid material from the filters 16 and a discharge conduit 22 is open to the vat 14 throughout the length of the vat to receive the pressed, solid material removed by the doctor blades 20. The conduit 22 contains a conventional discharge screw 24 rotatably driven in the direction shown by the arrow to shred the solid material and convey the shredded material from the press.

The drums 10 and 12 are provided with the new cleaning apparatus, shown schematiclly in FIG. 1, by number 26. The cleaning apparatus 26 remove any unwanted, deposited material or plugs from the filters 16 after the solid material is removed from the drums 10 and 12 by the doctor blades 20.

For each drum 10 and 12, the press includes a supply pipe 28 through which the suspension is introduced into the vat 14 adjacent to the upper end of the drum 10 or drum 12. Also, adjacent each supply pipe 28 there is proided a resilient sealing strip 30 which engages the filters 16 throughout the length of the drums 10 and 12 and prevent the suspension introduced by the supply pipes 28 from flowing around the drums 10 and 12 in the rotary direction opposite to that of the driven rotation of the drum.

During the operation of the press, the drums 10 and 12 are continuously rotated in opposite directions indicated by the arrows, and pressurized liquid supplied through the inlets 32 operate the pivoted baffles 34 to remove liquid from the suspension and a mat begins to form on each of the drums 10 and 12. The suspension containing fibrous material is continuously supplied to the vat 14 through the supply pipes 28 and flows along each drum 10 and 12 in the same direction as the drum rotation. The mat formed in the nip 18 by the drums 10 and 12 is removed by the doctor blades 20, shredded by screw 24, and conveyed from the press.

Any material on the filters 16, as well as any material which is plugging the filter 16, must be removed from the drums 10 and 12 in order to maintain the efficiency of the press. This is done by the cleaning apparatus 26, which is shown in more detail in FIG. 2 and FIG. 3.

Referring specifically to FIG. 2 and FIG. 3, the cleaning apparatus 26 is a stationary member extending longitudinally on the outside of the drum and across the path of filter 16. The stationary member has a metal, liquid-containing, inverted, generally U-shaped elongated member 40 with inclined sides 42 extending outwardly from the open part of the inverted U-shaped member 40. Liquid is prevented from flowing out of the ends of the member 40 by end plates 43 (only one shown in FIG. 2).

A flexible membrane 44 is attached to the member 40 by means of a plurality of longitudinally-spaced nuts and bolts 46 (see FIG. 2) which extend through the inclined membrane supports 48, the inclined portion 45 of membrane 44, and the inclined sides 42 of member 40.

Liquid under pressure is introduced into the cleaning apparatus 26 by means of liquid inlet pipe 50. The overflow from the cleaning apparatus flows out of the member 40 by means of pipes 52 and 54 and nozzles 56 and 58. The pipes 52 and 54 extend from end plates 43 and include bends 59 so that a major length of each of pipes 52 and 54 extend parallel to and behind member 40. With this arrangement the overflow is used to help wash the filter.

As shown more clearly in FIG. 3, the flexible membrane 44 has a plurality of openings 62. In the embodiment shown, the openings are elongated slots which extend entirely through the flexible membrane 44. The slots 62 are staggered along the length of the flexible membrane 44 and located so that every part of the filter 16 passes under at least one slot 62 during each revolution of the drum.

The flexible membrane 44 may be made of any suitable elastomer. Examples are reinforced neoprene, rubber, and polyurethane.

In operation, foreign material trapped in the openings of the filter 16 is formed through the opening by the applied liquid pressure. The liquid pressure within the member 40 forces the flexible membrane 44 into contact with the filter surface, which causes a mechanical wiping of the filter 16 as it passes under the flexible membrane 44. Any material loosely attached to the surface of the filter 16 is loosened and kept from entering under the flexible membrane 44. If desired, pressure pulsing of the filter can be accomplished by using a plurality of successive slots 62 in the direction of the filter surface travel.

Figure 4:
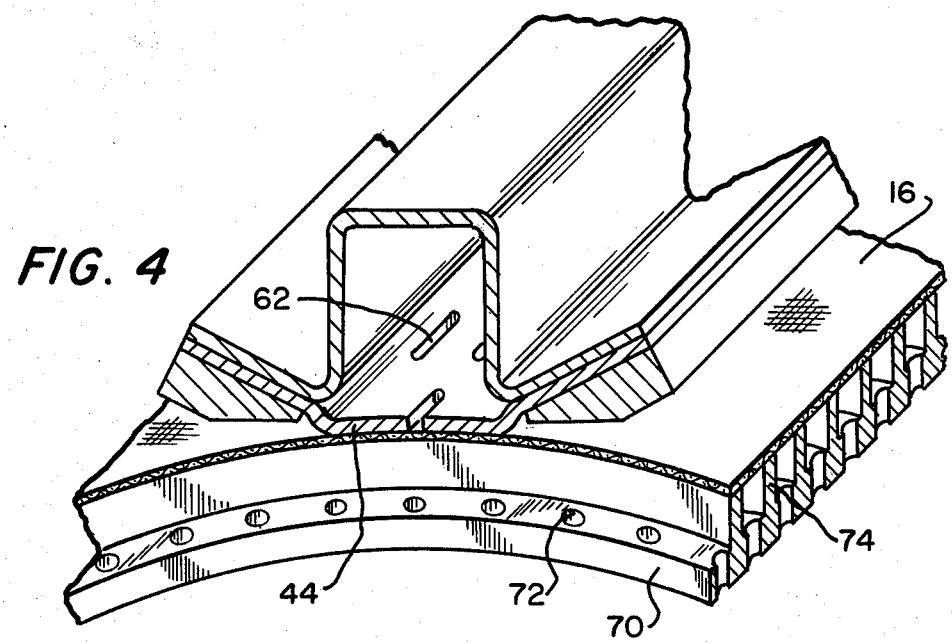
FIG. 4 is an enlarged, sectional view of the filter cleaning apparatus of FIG. 2 shown mounted on the outside of a drum having a support constructed to provide a backwash.

In the embodiment of FIG. 4, the support for the filter 16 is constructed to cause effective backwash of the filter 16. The support includes solid member 70 with a plurality of longitudinally spaced sets of holes 72 extending through the solid member 70. Each set of holes consists of a plurality of laterally-separated holes with each set separated from adjacent sets by lateral slats 74 spaced longitudinally and extending from member 70. The slats 74 thus form channels into which liquid enters after it has flowed through the slots 62 and through the filter 16. The holes 72 in each channel restrict the free flow of liquid into the center of the drum. This causes liquid to accumulate in the channels and sufficient pressure is developed in the channels to cause liquid to flow back through the filter 16 adjacent each side of the flexible membrane 44, as shown by the arrows, to perform a backwashing action to help remove any unwanted material from the filter 16.

The preferred embodiments have been described in relation to rotatable drums. However, the cleaning apparatus could also be used to clean filters or flat surface supports.

I claim:

1. In an apparatus for removing liquid from a fibrous material suspension to form a fibrous mat: a rotatable drum provided with a circumferential filter; means for applying a differential pressure across said filter to form a fibrous mat on the filter; means for thereafter removing the fibrous mat from the filter; and cleaning means for cleaning the filter after the fibrous mat has been removed, said cleaning means having a stationary member located outside the drum and extending along the length of the drum, said stationary member having a flexible membrane in contact with the filter, said flexible membrane having openings extending therethrough; and means for flowing liquid under pressure through said openings and through the filter.

2. An apparatus in accordance with claim 1 wherein: the rotatable drum has a filter support with channels into which the liquid flows after flowing through the filter, said filter support having means for restricting the flow of liquid into the center of the drum from said channels so that a backwash of liquid through the filter is provided.

3. An apparatus in accordance with claim 2 wherein: the filter support is a solid member with a plurality of longitudinally-spaced sets of holes extending through the solid member, each set of holes consisting of a plurality of laterally-separated holes, with each set being separated from adjacent sets by lateral slats whereby the slats form the channels and the sets of holes restrict the flow of liquid to cause the backwash.

* * * * *